United States Patent [19]

Obermeyer

[11] 4,185,729
[45] Jan. 29, 1980

[54] CONVEYOR LOAD SPACER

[75] Inventor: James H. Obermeyer, Crown Point, Ind.

[73] Assignee: Interlake, Inc., Oak Brook, Ill.

[21] Appl. No.: 956,650

[22] Filed: Nov. 1, 1978

[51] Int. Cl.² .............................................. B65G 13/00
[52] U.S. Cl. .................................................. 193/35 A
[58] Field of Search .................... 193/35 R, 35 A, 40; 221/13, 23, 289; 198/491, 492, 459

[56] References Cited

U.S. PATENT DOCUMENTS

| | | | |
|---|---|---|---|
| 3,312,320 | 4/1967 | Froio | 193/35 A |
| 3,473,642 | 10/1969 | Lorden et al. | 193/35 R |
| 3,532,201 | 10/1970 | McConnell | 193/35 |
| 3,655,021 | 4/1972 | Froio | 193/35 A |
| 3,700,078 | 10/1972 | Froio | 188/180 |
| 3,724,642 | 4/1973 | DeGood | 193/35 A X |
| 3,819,023 | 6/1974 | McClelland | 193/40 |
| 3,891,073 | 6/1975 | Coleman et al. | 193/35 A |

Primary Examiner—Robert B. Reeves
Assistant Examiner—Gene A. Church

Attorney, Agent, or Firm—Vogel, Dithmar, Stotland, Stratman & Levy

[57] ABSTRACT

A load spacing mechanism for a load conveyor in which an actuating member is mounted on the conveyor and pivotable between an extended position and a retracted position. The actuating member is connected by linkage to a support mechanism which in one position thereof supports a stop mechanism in the raised position, thereby to stop a load on the conveyor from advancing toward the actuating mechanism. When a load is lifted from the actuating member, the linkage operates, as the actuating member moves to the extended position thereof, to move the stop support away from the stop thereby permitting the load at the stop mechanism to force the stop mechanism downwardly and pass thereover toward the actuating mechanism. All of the actuating mechanism, the stop mechanism and the support mechanism are pivotly mounted to the conveyor thereby obviating the need for toggle mechanism and enabling the foregoing load spacing mechanism to operate with either heavy or light loads without adjusting the mechanism.

20 Claims, 5 Drawing Figures

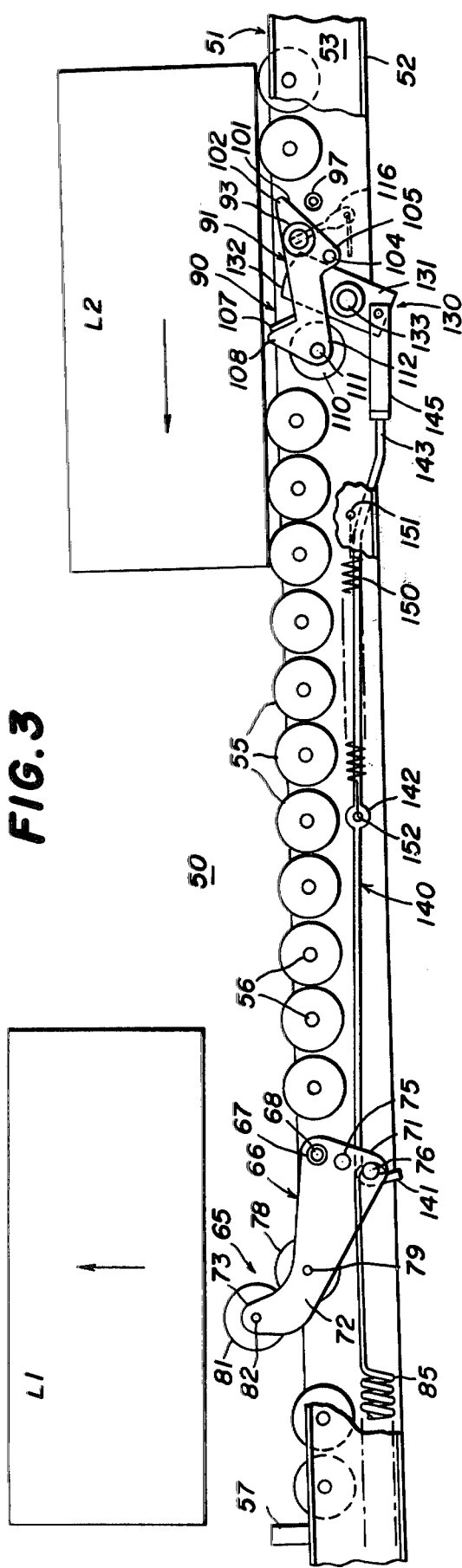

CONVEYOR LOAD SPACER

BACKGROUND OF THE DISCLOSURE AND PRIOR ART STATEMENT

The present invention relates to a conveyor load spacing mechanism and, more particularly, to a conveyor, whether the loads are light or heavy.

In conventional inclined flow gravity conveyors, loads travel along the conveyor down its incline toward a delivery end where they are removed one by one. In such conveyors, it is advantageous to prevent the entire run of loads positioned along the conveyor from bearing against the lead load at the delivery end of the conveyor so that the lead load can be easily removed from the conveyor. This is particularly desirable where the loads are very heavy such that the successive run of loads which bear against the lead load tend to wedge the lead load tightly against the end stop of the conveyor, thereby making removal of same difficult.

Various load stop and spacing mechanisms have been provided in the past to achieve this load spacing result. One such mechanism is shown in U.S. Pat. No. 3,532,201 issued Oct. 6, 1970 to Kennedy McConnell. In the mechanism shown therein, an actuating lever is connected to a toggle link stop mechanism by rigid rod linkage and these components are mounted adjacent the end of the conveyor. When the lead load is positioned over the actuating lever, it depresses the actuating lever whereby the stop mechanism is extended such that it is positioned in the path of the next successive load to arrest further movement of that load and space that load from the lead load. When the lead load is moved from the end of the conveyor, the actuating lever moves to an extended position and the stop mechanism is retracted to allow the next successive load to move down the conveyor and become the lead load.

In the aforementioned load spacing arrangement it is important that the rod linkage length and the distance between the actuating lever and the stop member be carefully adjusted or selected relative to the length of the loads or the pallets upon which the loads are carried. If the distance is too short, the stop mechanism will be extended too early and move upward toward the stop position before the lead load has cleared the stop mechanism. Since the actuating lever and stop mechanism are rigidly connected together by the linkage, the assembly will likely be sprung and damaged so as to become inoperative where extension is too early.

Conversely, if the distance is too great, the stop mechanism will be extended too late such that it will be extended beneath the next successive load, rather than in front of the load. Such late extensions not only will again result in damage to the rigid linkages, but will likely result in the reaching of two loads to the end of the conveyor at the same time. In order to prevent the latter occurence from happening, that is late extension, a braking mechanism is provided in the McConnell U.S. Pat. No. 3,532,201 for retarding movement of the next successive load temporarily in order to allow additional time for extension of the stop member.

U.S. Pat. No. 3,891,073 issued June 24, 1975 to Coleman and McConnell illustrates a mechanism for spacing successive loads on a conveyor in which the criticality of lengths of the mechanism is minimized and the mechanism itself may be substantially shortened in comparison to the previously described McConnell mechanism. In the Coleman and McConnell mechanism, the stop member may be moved toward its extended stop position even though a lead load has not yet cleared the stop mechanism and the mechanism is thereby positioned in readiness immediately to move into its stop position with respect to the next succeeding load as soon as the lead load has cleared the stop mechanism. The Coleman and McConnell mechanism may be employed for use with pallets of loads having differing lengths and thereby a substantial reduction in mechanism inventory is realized and loads of mixed pallet or load length may be handled simultaneously on a given conveyor without replacement of the mechanism for spacing the loads.

However, both the Coleman, et al patent and the McConnell patent employ toggle mechanisms which require significant spring forces to release same and in fact both patents include over center toggle mechanism in which the loads at the stop mechanism must be moved slightly upstream in order to release the stop mechanism, thereby requiring a great force to be applied against the stop mechanism. The use of heavy springs and the like thereby require rather heavy loads in order to maintain the actuating mechanism in the retracted position thereof. All of this is further required by the fact that both the McConnell patent and the Coleman, et al patent shows mechanisms in which the actuating mechanism is directly linked to the stop mechanism. The springs of both mechanisms have to be adjusted to accommodate heavy or light loads and cannot accommodate both.

Other patents relative to the present invention due to the disclosure of various conveyor braking mechanisms or speed control devices are the Lorden, et al U.S. Pat. No. 3,437,642, the Froio, U.S. Pat. No. 3,700,078, the Froio, U.S. Pat. No. 3,655,021, and the Froio, U.S. Pat. No. 3,312,320, copies of all the foregoing patents mentioned in this section are enclosed herewith.

SUMMARY OF THE PRESENT INVENTION

A principal object of the present invention is to provide a load spacing mechanism for a load conveyor in which the actuating mechanism and the stop mechanism are so constructed to function adequately without adjustment whether the load thereon is light or heavy.

An important object of the present invention is to provide a load spacing mechanism for a load conveyor comprising an actuating member movable between extended and retracted positions responsive to the absence or presence of the load thereon respectively, stop means movable between retracted and extended stop positions, support means movable between a first position thereof wherein the support means supports the stop means in the extended position thereof and a second position thereof wherein the support means does not support the stop means, linkage means interconnecting the actuating member and the support means, movement of the actuating member to the retracted position thereof permitting movement through the linkage of the support means to the first position thereof, movement of the actuating member to the extended position thereof resulting in movement through the linkage of the support means to the second position thereof while the stop means remains stationary in the extended stop position thereof, and means continually urging the actuating member to the extended position thereof, whereby when a load is present on the actuating member the actuating member is in the retracted position thereof and the support means is in the retracted position thereof to maintain a load stopped thereat and when a load is absent from the actuating member the actuating member is in the extended position thereof and the support means is in the second position thereof and the stop means having a load bearing thereagainst is easily movable to the retracted position thereof and away from the load, thus permitting the load on the conveyor to pass thereover.

Another object of the present invention is to provide a load spacing mechanism for a load conveyor of the type described wherein there is a roller member on at least one of the stop means and the support means in contact with a contact surface on the other of the means when the support means is in the first position thereof.

Yet another object of the present invention is to provide a load spacing mechanism of the type described wherein the contact surface has a radius of curvature equal to the distance between the support means pivot point and the point of contact between the contact surface and the roller.

A further object of the present invention is to provide a load spacing mechanism for a load conveyor of the type described in which there is provided first urging means connected to the actuating member continually urging the actuating member to the extended position thereof and second urging means connected to the stop means continually urging the stop means to the extended stop position thereof.

And still another object of the present invention is to provide a load spacing mechanism for a load conveyor comprising an actuating member movable between extended and retracted positions responsive to the absence or presence of a load thereof respectively, urging means connected to the actuating member continually urging the actuating member to the extended position thereof, stop means having a roller member thereon mounted for movement between retracted and extended stop positions, support means mounted for movement between a first position thereof wherein the support means contacts and supports the stop means in the extended stop position thereof and a second position thereof wherein the support means does not support the stop means, a contact surface on the support means having a radius of curvature no greater than the distance between the support means mounting point and the point of contact between the contract surface and the roller member, and linkage means interconnecting the actuating member and the support means, movement of the actuating member to the retracted position thereof permitting movement through the linkage of the support means to the first position thereof, movement of the actuating member to the extended position thereof resulting in movement through the linkage of the support means to the second position thereof while the stop means remains stationary in the extended stop position thereof, whereby when a load is present on the actuating member the actuating member is in the retracted position thereof and the support means is in the first position thereof and the stop means is in the extended stop position thereof to maintain a load stopped thereat and when a load is absent from the actuating member the actuating member is in the extended position thereof and the support means is in the second position thereof and the stop means having a load bearing thereagainst directly moves to the retracted position thereof and away from the load permitting the load on the conveyor to pass thereover.

A final object of the present invention is to provide a load spacing mechanism of the type described wherein both heavy and light loads can be handled without adjustment of the mechanism and the tripping forces necessary to pivot the stop means to the retracted position thereof are small irrespective of the load bearing against the stop means.

These and other objects of the present invention may more readily be understood when taken in connection with the foregoing specification and drawing, in which:

BRIEF DESCRIPTION OF THE DRAWINGS

FIG. 3 is a side elevational view like FIG. 2 showing the actuating mechanism in the extended position thereof and the stop means in the retracted position thereof permitting the load previously stationed at the stop means to move toward the actuating mechanism;

FIG. 4 is an enlarged side elevational view of the stop means and support mechanism therefor wherein the stop means is in the extended position thereof; and FIG. 5 is a view in section of the stop means and support mechanism therefor illustrated in FIG. 4 as seen along lines 5—5 thereof.

DESCRIPTION OF THE PREFERRED EMBODIMENT

Figure 1:
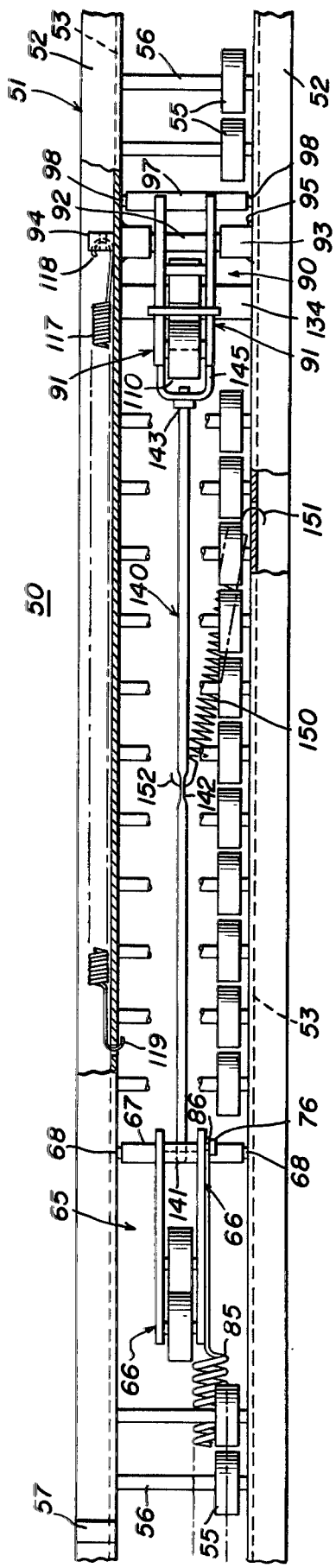
FIG. 1 is a top plan view of a conveyor having the load spacing mechanism of the present invention mounted thereon.

Referring now to the drawings, there is disclosed a conveyor 50 including two spaced apart generally parallel and longitudinally extending support frames 51. Each of the support frames 51 is U-shaped with two flanges 52 interconnected by a bight portion 53. A plurality of rollers 55 are each rotatably mounted on an appropriate shaft 56 and journaled for rotation between the opposed bights 53 of the support frame 51. At one end of the conveyor 50 is an upstanding end stop 57 to limit the longitudinal movement of loads, such as pallets L1 and L2 along the conveyor.

Mounted to the conveyor 50 is an actuating member 65 containing spaced apart parallel arms 66 fixedly mounted to a rod 67 having stub shaft 68 extending from the ends thereof and journaled for rotation in the bights 53. Each of the arms 66 includes an enlarged base portion 61, a middle portion 72, and an upwardly extending end portion 73. Two transversely spaced apart rods 76 interconnect the arms 66 of the actuating member 65 and are positioned vertically below the rod 67 which pivotly mounts the actuating member 65 to the conveyor frames 51. In the middle portion 72 of the arms 66 is a roller 78 journaled for rotation of a pin 79 interconnecting the spaced arms 66. In the upwardly extending end portion 73 of the arm 66 is a second roller 81 journaled for rotation on a pin 82 also interconnecting the arms 66. A coil spring 85 has an end thereof 86 connected to the pin 76 and another end thereof (not shown) fixedly connected to one of the associated conveyor support frames 51, thereby continually maintaining the actuating member 65 in tension and urged toward the extended position illustrated in FIG. 3.

Longitudinally spaced apart from the actuating member 65 along the conveyor 50 is a stop mechanism 90 which includes two spaced apart identically shaped arms 91 interconnected by a shaft 92 mounted in opposed friction bearings 93 which are welded as at 95 to the associated support frames 51. An end 94 of the shaft 92 extends beyond the associated friction bearing 93 through the bight 53 of the associated support frames 51 and between the opposed flanges 52, for a purpose hereinafter set forth.

Figure 2:
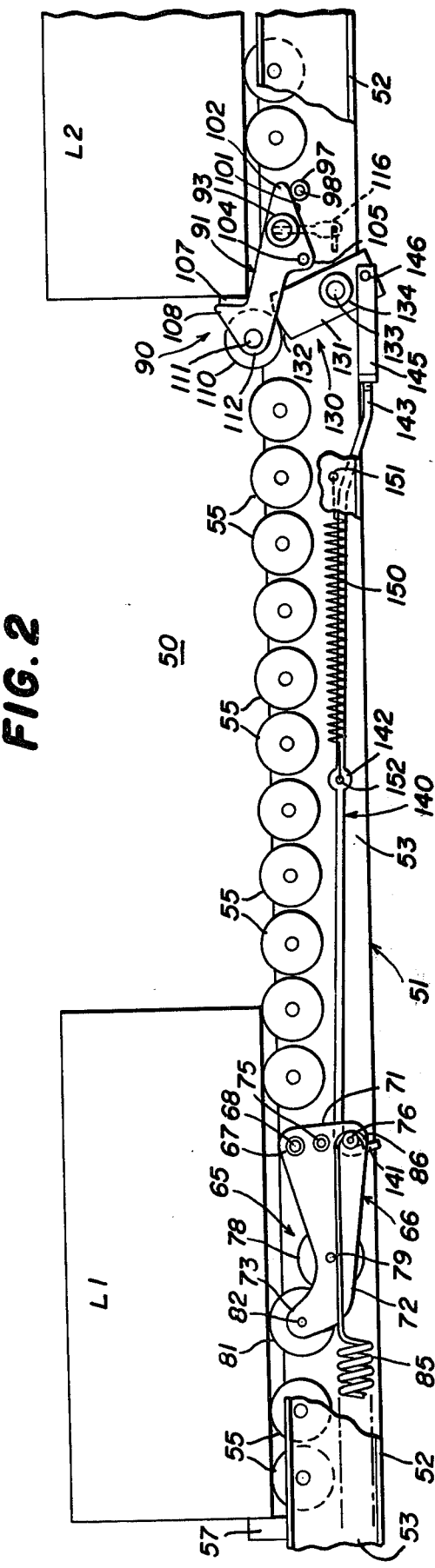
FIG. 2 is a side elevational view of the conveyor illustrated in FIG. 1 showing the actuating mechanism in the retracted position thereof and the stop means in the extended position thereof supported by the support mechanism and showing a load at both the actuating mechanism and the stop means.

A stop pin 97 and sheath 98 are fixedly mounted between the support frames 51 below the axis of the shaft 92 and longitudinally spaced therefrom a distance away from the end stop 57. There is an abutment surface 101 at one end 102 of the enlarged base of each of the arms 91, which abutment surface 101 is positioned to contact the pin 97 and sheath when the stop mechanism 90 is in the position illustrated in FIG. 2. The arms 91 of the stop mechanism 90 are pivotly mounted by means of a pin 104 journaled for rotation in the associated frames 51, the pin 104 being located in the heel 105 of the arms 91. A plate 107 is fixedly mounted to the extensions 108 of each of the arms 91, such as by welding, and serves as a stop for the loads, such as load L2, as seen in FIG. 2.

A roller 110 is journaled for rotation about a pin 111 mounted in the elbow 112 of each of the arms 91. The end 94 of the shaft 92 extending through the friction bearings 93 and the associated bight 53 has an arm 115 fixedly mounted thereto and extending downwardly between the associated flanges 52 to an end 116. A coil spring 117 has one end 118 thereof fixedly mounted to the arm 115 and particularly the end 116 thereof and has the other end 119 thereof mounted in the associated bight 53 of the end frame 51. Therefore, the stop mechanism 90 by means of the coil spring 117 is continuously urged toward the position illustrated in FIG. 2 wherein the arms 91 are positioned in the extended position thereof and the plate 107 is in position to stop a load L2.

A support mechanism 130 includes a dog 131 having a radiused surface 132 at the top thereof mounted to stub shafts 133, each positioned within an associated friction bearing 134 welded to the appropriate bights 53 of each of the side frames 51. The support mechanism 130 by means of the mounting of the dog 131 to the shafts 133 is pivotly mounted to the conveyor 50 as is the stop mechanism 90 and the actuating mechanism 65. The support mechanism 130 is pivotable between the position illustrated in FIG. 2 wherein the radiused surface 132 contacts the roller 110 of the stop mechanism 90 and supports same in the position illustrated in FIG. 3 wherein the dog 131 of the support mechanism 130 is out of effective contact with the roller 110 and thereby provides no support to the stop mechanism 90. Forward movement of the support mechanism 130 and particularly the dog 131 is limited by the pin 104 mounted in the heel 105 of the stop arms 91, the pin 104 also serving an additional purpose to be explained.

A linkage 140 interconnects the actuating mechanism 65 and the support mechanism 130. The linkage 140 has a hooked end 141 thereof which is positioned about the pin 76 and has a circular eyelet portion 142 in the center thereof as well as an offset angled end 143 leading to a clevis 145. The hook end 141 loosely engages the pin 76, and may disengage therefrom, as will be explained. The clevis 145 is connected to the support mechanism 130 and particularly the dog 131 by means of a bolt 146 and nuts 147. A spring 150 has an end 151 thereof connected to the appropriate side frame bight 53 and another end 152 thereof extending through the eyelet 142 of the linkage 140, thereby exerting a continuous force on the linkage toward the support mechanism 130 constantly to urge the linkage to the right in FIGS. 2 and 3. As seen, the spring 150 works against the large spring 85.

Operation of the load spacing mechanism of the present invention is hereinafter described. Referring now to FIG. 2 of the drawings, a load designated L1 is positioned on top of the actuating means 65 butting against the end stop 57. The presence of the load L1 at the actuating means 65, pivots the actuating member 65 about the pin or rod 67 to the retracted position thereof illustrated in the FIG. 2. When the actuating means 65 is in the retracted position thereof, the arm bases 71 are rotated furthest to the right or toward the stop mechanism 90. Therefore, the pin 76 about which is anchored the link 140 is in the furthest right most position. Hence, the link 140 is also in the furthest position to the right as seen in FIG. 2, while the spring 85 is in its utmost tnesion and the spring 150 is under the least amount of tension.

Still referring to FIG. 2, when the actuating mechanism 65 is in the retracted position thereof, the support mechanism 130 is in the first position thereof wherein the dog 131 is positioned for the radiused edge surface 132 to be in contact with the roller 110 of the stop mechanism 90 due to the fact that the linkage 140 is thrust to the right and hence rotates the dog 130 about the pivot point of the shaft 133. Since the shaft 133 is in the friction bearings 134, rotation of the dog 131 is facilitated. With the linkage 140 in the right most position thereof and the dog 131 in the position illustrated in FIG. 2, the stop mechanism 90 is supported by the support mechanism 130. Specifically, the stop mechanism 90 is in the extended stop position thereof and maintained therein by cooperation of the support mechanism 130 and the radiused surface 132 thereof in contact with the roller 110. Since forces exerted on the plate 107 of the stop mechanism 90 are transmitted through the center of the dog 131, extremely heavy loads can be maintained in position without adjustment of any mechanism.

Movement of the stop mechanism 90 to the extended stop position thereof is facilitated by the pivot mounting of the stop mechanism and particularly the arms 91 thereof on the shaft 92 which are housed in the friction bearings 93. While the support mechanism 130 is in the first or support position thereof wherein the radiused surface 132 thereof is in contact with the roller 110 of the stop mechanism 90, the stop mechanism is effective to prevent further movement of a load L2 along the conveyor 50 and particularly the bar 107 contacts the leading edge of the load L2 and prevents further movement along the conveyor on the rollers 55. As noted, the spring 117 continually urges the stop mechanism 90 to the extended stop position thereof but is not a meaningful factor in maintaining a load stopped.

When the load L1 is moved upwardly as by a forklift from the actuating means or mechanism 65, the action of the spring 85 pivots the actuating member 65 to the extended position thereof, all as illustrated in FIG. 3. The base 71 of the arms 66 move about the pivot point 67, thereby moving the linkage 140 to the left as viewed in FIG. 3. The movement of the actuating mechanism or means 65 to the extended position thereof results in upward movement of the rollers 78 and 81 and movement of the linkage 140 to the left thereby pivoting the support mechanism 130 from the position in FIG. 2 to the position of FIG. 3. The support mechanism in FIG. 3 is out of effective contact with the roller 110 of the stop mechanism and in particular the radiused surface 132 of the support mechanism 130 no longer supports the stop mechanism 90 in the extended or stop position thereof. Forward movement of the dog 131 of the support mechanism 130 is stopped by contact of the dog with the pin 104 in the heel of the arms 91. Movement of the dog 131 from the position of FIG. 2 to that of FIG. 3 requires substantially the same tripping force whether the load L2 is extremely heavy or light since the contact between the surface 132 and the roller 110 is a rolling friction contact and no force has to be exerted against the load L2.

After the actuating mechanism 65 moves to the extended position thereof illustrated in FIG. 3, the stop mechanism 90 is robbed of its support by the support mechanism 130 and therefore the only force maintaining the stop mechanism in the extended stop position thereof is the action of the spring 117 on the arm 115. The spring 117 exerts only a weak force on the stop mechanism 90 and the force of the load L2, even if it is light, in cooperation with the gravity feed of the conveyor 50, that is, the conveyor extends downwardly toward the end stop 57, causes the load L2 to force the stop mechanism 90 into the retracted position thereof, illustrated in FIG. 3. Rotation of the stop mechanism 90 from the extended position thereof in FIG. 2 wherein the abutment surface 101 is in contact with the stop pin 97 to the retracted position thereof in FIG. 3 wherein downward movement of the stop mechanism is halted by the action of the spring 117 permits the load L2 to move to the left along the rollers 55 toward the actuating mechanism 65.

As soon as the load L2 clears the stop mechanism 90 and particularly the plate 107 thereof, the action of the spring 117 urges the stop mechanism to again return to the extended or stop position thereof. To the extent that the pin 104 bears against the dog 131 of the support mechanism 130, movement of the stop mechanism 90 to its extended stop position will be delayed until the actuating mechanism 65 moves to its retracted position illustrated in FIG. 2. In the event that the stop pin 104 is not incorporated into the stop mechanism 90, then the urging of the spring 117 immediately will move the stop mechanism 90 to the fully extended stop position thereof after the load L2 has cleared the arms 91.

The pin 104 not only serves to position the dog 131 of the support mechanism and to prevent undue clockwise rotation thereof, but when the system is to be demonstrated without a load either at the actuating mechanism 65 or at the stop mechanism 90, movement of the actuating mechanism 65 to the fully extended position under the influence of the spring 85 causes the dog 131 to rotate in a clockwise direction and bear against the pin 104. The force of the dog 131 bearing against the pin 104 is sufficient to overcome the force of the spring 117 and cause the stop mechanism 90 to move to the retracted position illustrated in FIG. 3. This facilitates demonstration of the equipment without the necessity of loading same.

After the load L2 reaches the actuating mechanism 65, the leading edge of the load first contacts the roller 78 and causes the arms 66 of the actuating mechanism 65 to pivot about the pin 67 toward the retracted position thereof and then the load contacts the roller 82 and causes the mechanism to pivot to the fully retracted position illustrated in FIG. 2.

As the actuating mechanism 65 pivots to the fully retracted position thereof as illustrated in FIG. 2, the dog 131 of the support mechanism 130 pivots in a counterclockwise direction about the shaft 133 due to the movement of the linkage 140, as previously explained, thereby freeing the stop mechanism 90, in the event that the stop pin is present, to move to the fully extended position thereof under the urging of the spring 117. At this point, the load spacing mechanism is in the position illustrated in FIG. 2 wherein the stop mechanism 90 is fully cocked or in the extended stop position thereof, the actuating mechanism 65 is in a fully retracted position thereof, and the support mechanism 130 is in the first or support position thereof wherein the radiused surface 132 of the dog 131 is in contact with and supports the roller 110 thereby to maintain the stop mechanism 90 in the fully extended or stop position thereof.

Since the spring 85 is adjusted so that a relatively light load L1 or L2 will cause the actuating mechanism 65 to assume the fully retracted position thereof, and the configuration of the support mechanism 130 and the stop mechanism 90 and in particular the relationship between the radiused surface 132 of the dog 131 and the roller 110 is such that very heavy loads L2 can be maintained at the stop mechanism 90 without movement of the dog 131, it is seen that the mechanism disclosed herein can accommodate both light and heavy loads in the same series of pallet loads without adjusting the mechanism. So long as the radiused surface 132 is not deformed, no backward movement of the load L2 is necessary to trip the stop mechanism 90 and move same to the fully retracted position thereof illustrated in FIG. 3, whereby the spring 85 need not be massive and therefore the actuating mechanism 65 can be moved to the fully retracted position thereof by light loads. To this end, hardened steel is preferably used for the dog 131 so that the radiused edge surface 132 is not deformed by the forces produced thereon by the load L2.

As previously noted, the end 141 of the linkage 140 is loosely positioned about the pin 76, and the reason for this is that at times the operator of a forklift will initially remove a load L1 from the actuating mechanism 65 thereby causing the stop mechanism 90 to pivot to the retracted position thereof and the dog 131 to pivot to the position illustrated in FIG. 3 and then change his mind and again set the load L1 down onto the actuating mechanism 65. If the linkage 140 were securely wrapped about the pin 76, this sequence of events would cause the linkage 140 to buckle or snap because the dog 131 would not be able to pivot counterclockwise due to the presence of the roller 110 in its path. This assumes that the actuating mechanism 65 would be returned to its fully retracted position before the load L2 would entirely pass over the stop mechanism 90 thereby preventing the stop mechanism 90 from being cocked or returned to its fully extended stop position thereof by the action of the spring 117. If this sequence of events occurs, then the linkage 140 can disengage from the pin 76 due to the construction of end 141 and the action of the spring 150 will cause the dog 131 to pivot about the shaft 133 in a counterclockwise direction as soon as the spring 117 cocks the stop mechanism 90 to its fully extended stop position thereof, thereby returning the support mechanism 130 and stop mechanism 90 to the positions illustrated in FIG. 2, notwithstanding the fact that the linkage 140 is now disengaged from the pin 76.

In the event that the foregoing sequence of events occur, the operator will have to remove two loads L1 and L2 from the end stop 57 and thereafter engage the linkage 140 with the pin 76 to return the mechanism to its fully operable condition. This fail-safe mechanism provides two functions. In the first place, the fail-safe mechanism insures that the linkage 140 will not snap or bend if the forklift operator changes his mind and redeposits a load on the actuating mechanism 65 before the load spacing mechanism can fully cycle. In the second place, the fail-safe mechanism insures that the stop mechanism 90 will be returned to its fully extended or stop position thereof with the dog 131 in the support position thereof even if there is a malfunction at the actuating mechanism 65. This is extremely important since it prevents a large number of pallets from piling up at the end stop 57.

It is important that the radius of curvature of surface 132 not be greater than the distance between the center of pin 133 and the point of contact between the dog 131 and the roller 110 so that the stop mechanism 90 can pivot directly to the retracted position thereof and away from the load L2 without having to force the load L2 upstream. The specific configuration of the support mechanism 130 and the stop means 90 results in the forces transmitted to the dog 131 by a load L2 bearing against the plate 107 passing through the centers of the roller 110 and the shaft 133. This results in very heavy loads L2 being able to be maintained by the stop means 90 since there is no turning moment imparted to the dog 131 and yet the tripping force necessary to pivot the dog 131 out of support remains light due to the rolling contact between the surface 132 and the roller 110.

It will be seen therefore that there has been provided a load spacing mechanism which accommodates both light and heavy loads in the same series of pallets and is effective to operate without adjustments to the springs whether a light or heavy load is present at the actuating mechanism 65 and the stop mechanism 90. Further, the tripping forces needed to release the stop mechanism 90 from its fully extended position are very slight and therefore the present mechanism is a great advance over prior art mechanisms which needed heavy duty toggle mechanism to trip the stop mechanism and also required continual adjustment to service light and heavy loads and could not accommodate pallets of mixed heavy and light loads.

While there has been disclosed what at present is considered to be the preferred embodiment of the present invention, it will be understood that various modifications and alterations can be made therein without departing from the true spirit and scope of the present invention, and it is intended to cover in the appended claims all such variations and modifications thereof.

What is claimed is:

1. A load spacing mechanism for a load conveyor comprising an actuating member movable between extended and retracted positions responsive to the absence or presence of a load thereon respectively, stop means movable between retracted and extended stop positions, support means movable between a first position thereof wherein said support means supports said stop means in the extended stop position thereof and a second position thereof wherein said support means does not support said stop means, linkage means interconnecting said actuating member and said support means, movement of said actuating member to the retracted position thereof permitting movement through said linkage of said support means to the first position thereof, movement of said actuating member to the extended position thereof resulting in movement through said linkage of said support means to the second position thereof while said stop means remains stationary in the extended stop position thereof, and means continually urging said actuating member to the extended position thereof, whereby when a load is present on said actuating member said actuating member is in the retracted position thereof and said support means is in the first position thereof and said stop means is in the extended stop position thereof to maintain a load stopped thereat and when a load is absent from said actuating member said actuating member is in the extended position thereof and said support means is in the second position thereof and said stop means having a load bearing thereagainst is easily movable to the retracted position thereof and away from the load, thus permitting the load on the conveyor to pass thereover.

2. The load spacing mechanism set forth in claim 1, wherein said actuating member is mounted to said conveyor and pivotable between the extended and retracted positions thereof.

3. The load spacing mechanism set forth in claim 1, wherein said actuating member has two freely rotatable rollers thereon positioned such that a load encountering said actuating member in the extended position thereof first encounters one of said rollers to force said actuating member toward the retracted positions thereof and thereafter contacts the other of said rollers to maintain said actuating member in the retracted position thereof.

4. The load spacing mechanism set forth in claim 1, wherein said means continually urging said activating member to the extended position thereof is a coil spring fixedly mounted to said actuating member at one end of said spring and mounted to the load conveyor at the other end of said spring.

5. The load spacing mechanism set forth in claim 1, wherein said stop mechanism is mounted to said conveyor and pivotable between the retracted and extended stop position thereof.

6. The load spacing mechanism set forth in claim 1, wherein said stop mechanism has a radiused surface thereon positioned to contact said support means when said stop means is in the extended stop position thereof and said support means is in the first position thereof.

7. The load spacing mechanism set forth in claim 1, wherein said support means is mounted to said conveyor and pivotable between the first and second positions thereof.

8. The load spacing mechanism set forth in claim 1, wherein said linkage is loosely connected to said actuating means to enable said linkage to disengage from said actuating means if said linkage is put into compression and further comprising urging means continually urging said support means to the first position thereof.

9. The load spacing mechanism set forth in claim 1, wherein the second position of said support means is defined by a limit pin on said stop means, whereby movement of said support means away from said first position thereof is limited by said pin on said stop means when said stop means is in the retracted position thereof to prevent further movement of said support means away from the first position thereof.

10. The load spacing mechanism set forth in claim 1, wherein said stop means is pivotly mounted to said conveyor and a stop pin is provided on said conveyor to prevent pivotal movement of said stop means beyond the extended stop position thereof, thereby to limit pivoting movement of said stop means to a preselected extended stop position.

11. The load spacing mechanism set forth in claim 1, wherein, said stop means includes a shaft for pivoting movement of said stop means between the retracted and extended stop positions thereof and friction bearings mounted on the conveyor for said shaft to provide easy pivotal movement between said positions.

12. The load spacing mechanism set forth in claim 1, wherein, said support means includes a shaft for pivoting movement of said support means between said first and second positions thereof and friction bearings mounted on the conveyor for said shaft to provide easy pivotal movement between said positions.

13. A load spacing mechanism for a load conveyor comprising an actuating member movable between extended and retracted positions responsive to the absence or presence of a load thereon respectively, stop means movable between retracted and extended stop positions, support means movable between a first position thereof wherein said support means supports said stop means in the extended stop position thereof and a second position thereof wherein said support means does not support said stop means, a roller member on at least one of said stop means and said support means, a contact surface on the other of said stop means and said support means and cooperating with said roller member when said support means is in the first position thereof, linkage means interconnecting said actuating member and said support means, movement of said actuating member to the retracted position thereof permitting movement through said linkage of said support means to the first position thereof, movement of said actuating member to the extended position thereof resulting in movement through said linkage of said support means to the second position thereof, and means continually urging said actuating member to the extended position thereof, whereby when a load is present on said actuating member said actuating member is in the retracted position thereof and said support means is in the first position thereof and said stop means is in the extended stop position thereof to maintain a load stopped thereat and when a load is absent from said actuating member said actuating member is in the extended position thereof and said support means is in the second position thereof and said stop means having a load bearing thereagainst directly moves to the retracted position thereof and away from the load thus permitting the load on a conveyor to pass thereover.

14. The load spacing mechansim set forth in claim 13, wherein, said support mechanism is mounted to the conveyor below the mounting of said stop means and between said support means and said actuating means.

15. The load spacing mechanism set forth in claim 13, wherein, said roller member is mounted on said stop means and said contact surface has a radius of curvature equal to the distance between the pivot point of said support means and the surface of said roller member in contact with said contact surface to provide rolling contact between said roller member and said contact surface during movement of said support means from the first position thereof to the second position thereof.

16. A load spacing mechanism for a load conveyor comprising an actuating member movable between extended and retracted positions responsive to the absence or presence of a load thereon respectively, first urging means connected to said actuating member continually urging said actuating member to the extended position thereof, stop means movable between retracted and extended stop positions, second urging means connected to said stop means continually urging said stop means to the extended stop position thereof, said first and second urging means being independently adjustable, support means movable between a first position thereof wherein said support means supports said stop means in the extended stop position thereof and a second position wherein said support means does not support said stop means, and linkage means interconnecting said actuating member and said support means movement of said actuating member to the retracted position thereof permitting movement through said linkage of said support means to the first position thereof, movement of said actuating member to the extended position thereof resulting in movement through said linkage of said support means to the second position thereof, whereby when a load is present on said actuating member said actuating member is in the retracted position thereof and said support means is in the first position thereof and said stop means is in the extended stop position thereof to maintain a load stopped thereat and when a load is absent from said actuating member said actuating member is in the extended position thereof and said support means is in the second position thereof and said stop means having a load bearing thereagainst is easily movable to the retracted position thereof and away from the load permitting the load permitting the load on the conveyor to pass thereover.

17. The load spacing mechanism set forth in claim 16, wherein, said second urging means is connected to said stop means through an elongated lever arm fixedly mounted thereto.

18. The load spacing mechanism set forth in claim 16, wherein said linkage means is loosely connected to said actuating means to enable said linkage to disengage therefrom if said linkage is unduly put into compression, and further comprising third means continually urging said support mechanism toward the first position thereof.

19. A load spacing mechanism for a load conveyor comprising an actuating member movable between extended and retracted positions responsive to the absence or presence of a load thereon respectively, urging means connected to said actuating member continually urging said actuating member to the extended position thereof, stop means having a roller member thereon mounted for movement between retracted and extended stop positions, support means mounted for movement between a first position thereof wherein said support means contacts and supports said stop means in the extended stop position thereof and a second position thereof wherein said support means does not support said stop means, a contact surface on said support means having a radius of curvature no greater than the distance between said support means mounting point and the point of contact between said contact surface and said roller member, and linkage means interconnecting said actuating member and said support means, movement of said actuating member to the retracted position thereof permitting movement through said linkage of said support means to the first position thereof, movement of said actuating member to the extended position thereof resulting in movement through said linkage of said support means to the second position thereof while said stop means remains stationary in the extended stop position thereof, whereby when a load is present on said actuating member said actuating member is in the retracted position thereof and said support means is in the first position thereof and said stop means is in the extended stop position thereof to maintain a load stopped thereat and when a load is absent from said actuating member said actuating member is in the extended position thereof and said support means is in the second position thereof and said stop means having a load bearing thereagainst directly moves to the retracted position thereof and away from the load permitting the load on the conveyor to pass thereover.

20. The load spacing mechanism set forth in claim 19, wherein said roller member and contact surface are positioned so that the force transmitted to said support means due to a load bearing against said stop means is transmitted through the center of the roller member and the center of the radius of curvature of said contact surface.

* * * * *

UNITED STATES PATENT AND TRADEMARK OFFICE
CERTIFICATE OF CORRECTION

PATENT NO. : 4,185,729
DATED : January 29, 1980
INVENTOR(S) : James H. Obermeyer It is certified that error appears in the above-identified patent and that said Letters Patent are hereby corrected as shown below:

Column 6, line 19, "tne-" should be --ten---.

Column 12, line 29, after "permitting" delete "the load permitting--.

Signed and Sealed this

Tenth Day of June 1980

[SEAL]

Attest:

SIDNEY A. DIAMOND

Attesting Officer

Commissioner of Patents and Trademarks